United States Patent Office 3,671,097
Patented June 20, 1972

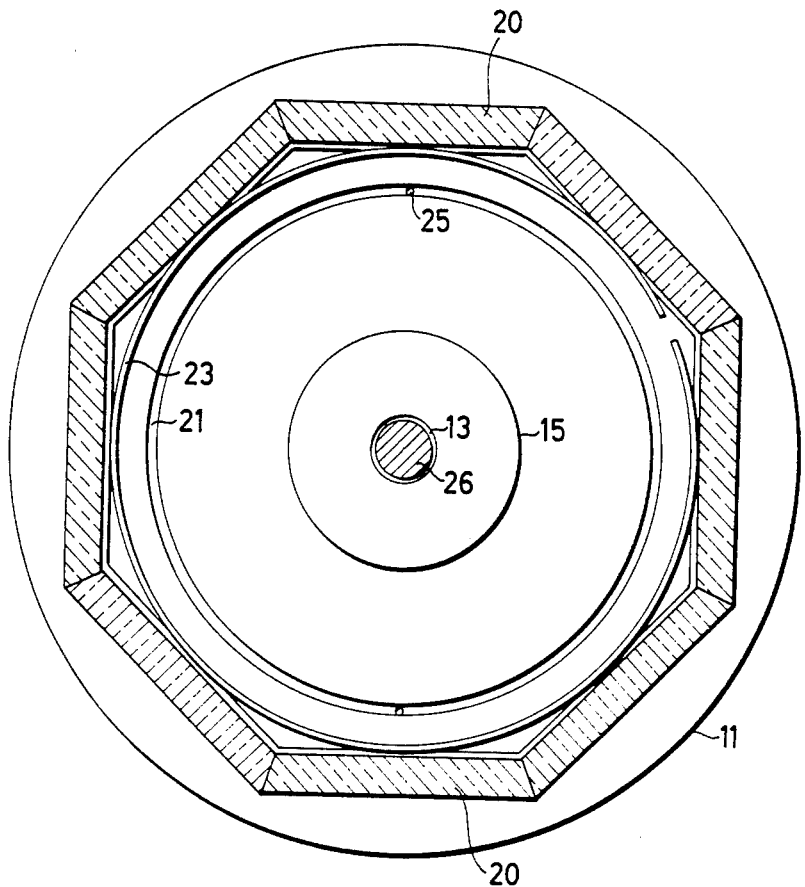

---

3,671,097
ARRANGEMENT IN OPTICAL CHARACTER READING

Nils Evert Johan Stahl, Hjortstigen 18, Stocksund, Sweden, and Per Skonare, Tyresovagen 355, Enskede, Sweden
Filed July 12, 1968, Ser. No. 744,403
Int. Cl. G02b 17/00
U.S. Cl. 350—7
1 Claim

ABSTRACT OF THE DISCLOSURE

Characters are read from a character carrier by means of a rotatable mirror having two brackets with slots and a plurality of reflecting elements located in these slots and forming a substantially continuous optical surface.

---

The present invention relates to an arrangement or device for reading characters from a character carrier by optical means, including a rotating mirror serving to pick up said characters and through reflection transfer these for further processing, for instance to an optical device.

Such characters could consist of digits and letters printed on a character carrier in form of a paper strip for control purpose of the type, which, by way of example is used in ticket selling machines or cash registers. The information printed on said control strips for different purposes such as statistics or accounting, is fed into computers, which in different ways process the information and supply data or statements. The characters of the character carrier are fed by the rotating mirror, which is arranged to be driven by uniform speed, adapted to the feed of the character carrier.

Rotating mirrors for this purpose are already known and consist of homogeneous glass bodies, which are given a number, usually eight, twelve or sixteen equal plane surfaces through precision grinding. Such mirrors are subject to three main disadvantages; firstly, it is very difficult to obtain these equal surfaces through the grinding method, which often causes too great tolerances between the adjacent, optically active surfaces and the character reading of the prism shaped body is carried with insufficient carefulness, which in a negative way appears on the statement analyzed by the computer. Secondly, the manufacturing costs for such rotating mirrors are very high, depending on the degree of difficulty of the grinding procedure. Finally, which is very important, in case one of the optically active surfaces gets scratched or in some other way becomes useless, no repairs can be undertaken, but an entirely new mirror must be made in the described way.

The object of the present invention is to eliminate the above disadvantages and to provide a rotating mirror of improved design, which is cheap to manufacture and to service.

According to the invention, the improved rotatable mirror consists of a number of optically active elements, each of these elements being provided with a bright surface and each of these elements being detachably arranged in a bracket.

Within the scope of the present invention several modifications are possible. Consequently the bracket and the means to keep the mirror elements in this bracket can vary. According to a suitable embodiment, the bracket consists of two detachably interconnected elements, between which the mirror elements are arranged and guided. The guidings can consist of annular slots, wherein the mirror elements are arranged with a certain clearance.

Figure 1:
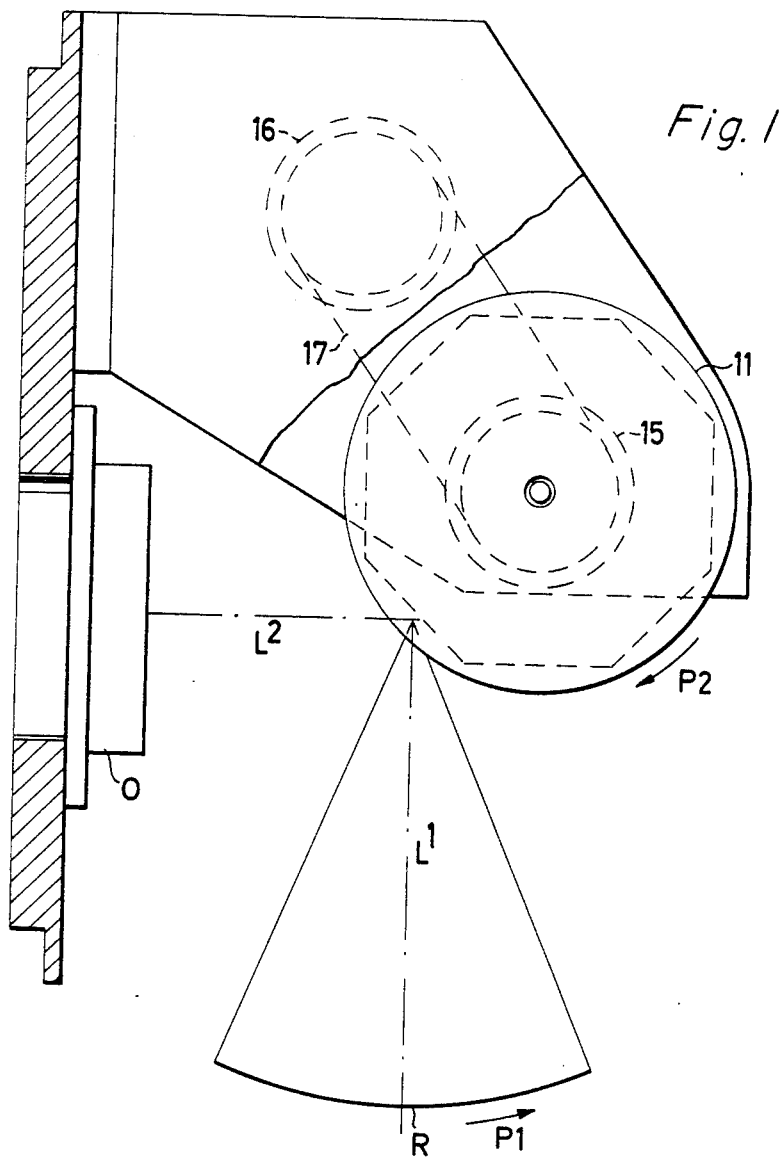
Figure 2:
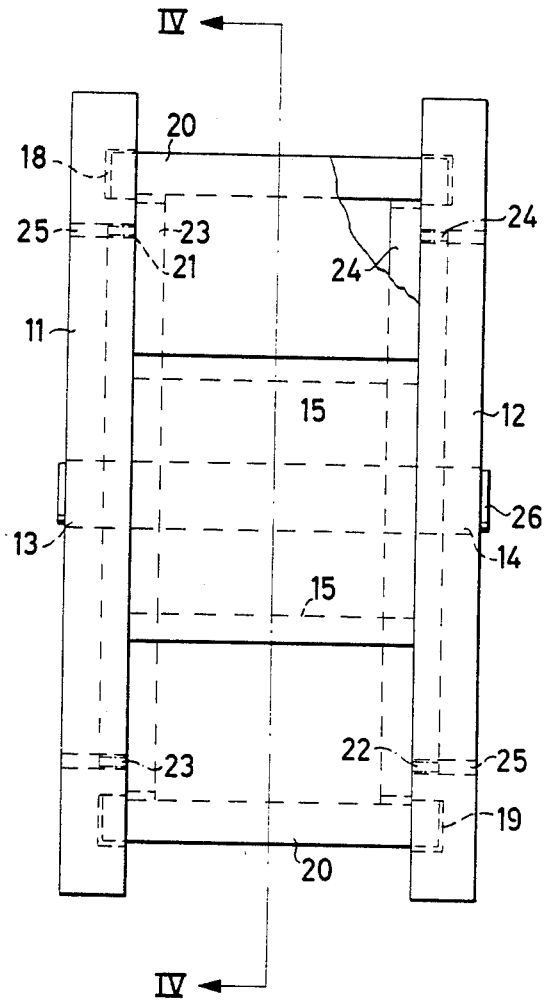
Figure 3:
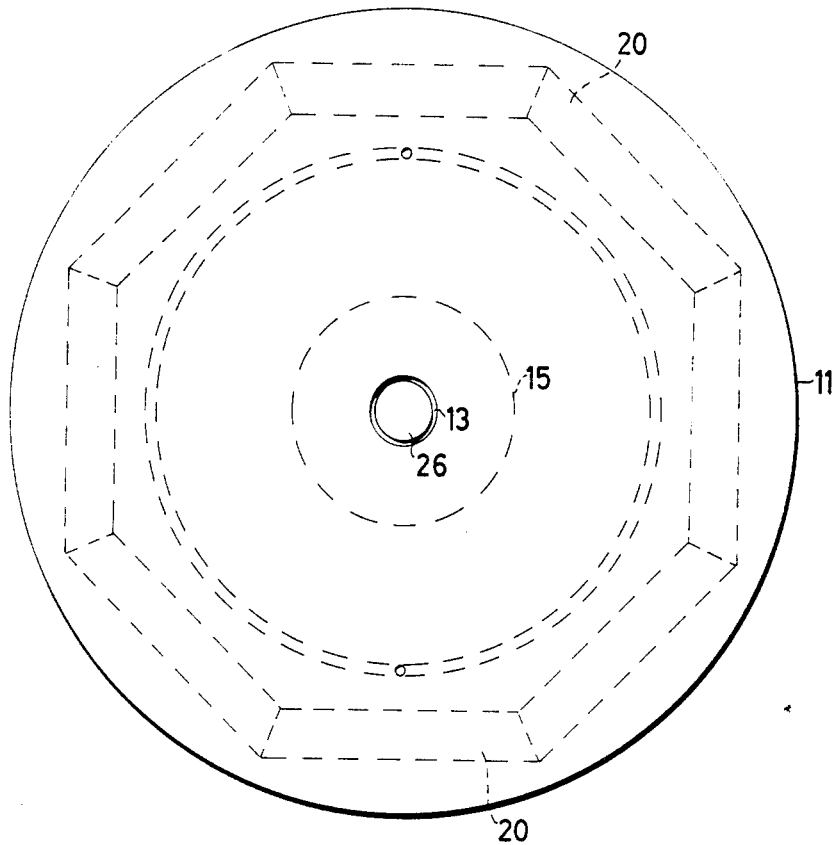

For a better understanding of the invention and to show how the same may be carried into effect reference will now be made, by way of example, to the accompanying drawings, in which:

FIG. 1 is a diagrammatic outline of a part of an installation including a rotatable mirror.
FIG. 2 is a front view on a bigger scale of the mirror according to the invention.
FIG. 3 is a side view of the same mirror.
FIG. 4 is a section along the line IV—IV in FIG. 2.

In the embodiment shown in the drawings, the strip R, that is the character carrier, is fed in the direction indicated by the arrow $p_1$. A rotating mirror is driven by a source of power, not shown in the drawings, and indicated by 10. The mirror 10 is rotatable in a direction indicated by the arrow $p^2$ and casts an image of characters of the strip R through an optical device O to a photoelectric line scanning device. The lines $L^1$–$L^2$ designate the directions of reflection of the characters of the strip R.

In the embodiment illustrated in FIGS. 2–4, the rotatable mirror according to the invention consists of two annular elements 11 and 12, each of said elements being provided with a central boring 13 resp. 14, and constitutes with each other through an axle 26. A drum 15 constitutes a transmission element for the rotary movement, which is achieved through a wheel 16 connected with the source of power. The wheel 16 is connected by an endless belt 17 with the drum 15 of the bracket 11, 12. These elements 11, 12 are detachably connected with each other and are provided with annular, relatively shallow slots 18, 19.

The improved mirror is formed by moving the elements 11, 12 apart and inserting a number of elements 20 in one of the slots 18 or 19. Said elements 20 have at least a planed outer surface and are made of glass or a metal with optical function and can be with or without an extra reflecting coating. These mirror elements are preferably of rectangular shaping and have bevelled ends causing two adjacent elements 20 to bear against each other and theoretically forming a continuous surface. When the annular slot of one of the elements 11, 12 has been filled with the above described mirror elements 20, the opposite ends of said elements are inserted in the corresponding slot of the other bracket element. In this comparatively simple way a mirror of prism shaping has been created and it is obvious that the number of mirror elements can vary according to different purposes.

In the embodiment illustrated in the drawings, the mirror elements 20 are arranged in the annular slots 18, 19 of the bracket elements 11, 12 with a certain clearance, which simplifies disassembling and exchange of mirror elements 20. Due to gravitation during the rotation of the mirror each element 20 will be firmly held against the outer edges of the slots 18, 19. In order to avoid even the theoretical risk of causing an inclination of the mirror elements during the working cycle, one or both of the bracket elements are provided with an annular slot 21 respectively 22, which are restricted in axial direction but in one or several places forming a through slot so as to constitute inspection hole or holes 25 in the bracket elements. Said slot or slots are arranged inside the mirror elements and provided with a resilient means 23 respectively 24, by way of example in form of a steel band. When the mirror elements have been inserted and the bracket elements have been put together a suitable, pointed tool is inserted in the inspection hole or holes 25 and the steel band can simply be displaced out of the slots 21, 22. The steel band will thereby wind up and automatically with a certain force bear against the back of the mirror elements 20 and bring these to bear against the slots 18, 19.

From the above description it is obvious, that the improved mirror forms a uniform body.

The mirror elements can consist of any suitable elements having required optical capacity, by way of example glass bodies or surfaced metal bodies.

Within the scope of invention it is possible to modify the annular slots 18, 19 of the bracket elements to obtain a certain adjustment of each mirror element.

We claim:

1. A character reader for reading characters from a character carrier, said reader comprising a rotatable mirror, an optical device, said mirror receiving images of the characters and transmitting them to said optical device for further processing, said mirror comprising a plurality of mirror elements disposed adjacent each other to form a substantially continuous light reflecting surface, supporting means comprising two supports and means detachably interconnecting said two supports, said mirror elements being disposed between the two supports, each support having a slot in which one end of each mirror element is inserted with a clearance, said slots being near the outer edges of the supports, and resilient means bearing against the back of each mirror element to press the mirror element against the edges of said slots.

References Cited

UNITED STATES PATENTS

| 3,293,655 | 12/1966 | McNaney | 350—7 |
| 3,040,627 | 6/1962 | Bohn et al. | 350—7 |
| 3,265,878 | 8/1966 | Talbot | 350—288 |

FOREIGN PATENTS

| 200,644 | 7/1923 | Great Britain | 350—100 |

DAVID SCHONBERG, Primary Examiner

M. J. TOKAR, Assistant Examiner

U.S. Cl. X.R.

350—299; 248—473